United States Patent
Peng et al.

(10) Patent No.: US 6,925,517 B2
(45) Date of Patent: Aug. 2, 2005

(54) BUS FOR SUPPORTING PLURAL SIGNAL LINE CONFIGURATIONS AND SWITCH METHOD THEREOF

(75) Inventors: Sheng-Chang Peng, Taipei (TW); Chau-Chad Tsai, Taipei (TW); Chih-kuo Kao, Taipei (TW); Chi-Che Tsai, Kaohsiung Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 298 days.

(21) Appl. No.: 10/249,361

(22) Filed: Apr. 3, 2003

(65) Prior Publication Data

US 2004/0215866 A1 Oct. 28, 2004

(30) Foreign Application Priority Data

Apr. 4, 2002 (TW) ........................................ 91106811 A

(51) Int. Cl.⁷ ........................... G06F 13/14; G06F 13/40
(52) U.S. Cl. ......................... 710/305; 710/306; 710/316
(58) Field of Search ................................ 710/306, 305, 710/316, 20, 31, 33, 313; 370/395.1, 380, 230, 391; 326/37; 709/253; 327/365; 361/683.736

(56) References Cited

U.S. PATENT DOCUMENTS

| | | | |
|---|---|---|---|
| 4,635,250 A | * | 1/1987 | Georgiou .................... 370/380 |
| 6,545,504 B2 | * | 4/2003 | Sun et al. ..................... 326/37 |
| 6,577,161 B2 | * | 6/2003 | Sun et al. ..................... 326/49 |
| 6,678,829 B1 | * | 1/2004 | Teggatz et al. ............. 713/300 |
| 6,683,876 B1 | * | 1/2004 | Tornes et al. ............ 370/395.1 |

OTHER PUBLICATIONS

"A subscriber line interface processor for asynchronous transfer mode switching system" by Yamamoto, K.; Kihara, K.; Yamazaki, K.; Kobayashi, H. (abstract only) Publication date: Feb. 14–16, 1990.*

* cited by examiner

*Primary Examiner*—Gopal C. Ray
(74) *Attorney, Agent, or Firm*—Jiang Chyun IP office

(57) ABSTRACT

A bus for supporting plural signal line configurations and the method to switch it, used to operate in a bus between the control chips to maintain its operation flexibility. When the data transfer load in between the control chips is suitable for the bi-direction transfer, the signal line configuration of the bi-direction transfer is selected. When the direction of the bi-direction transfer switches frequently, the other signal line configuration is selected. That is, the bus signal lines are divided into two parts, each part is in charge of the data transfer in each uni-direction to avoid the turn around cycle that impacts the transfer performance.

14 Claims, 8 Drawing Sheets

US 6,925,517 B2

BUS FOR SUPPORTING PLURAL SIGNAL LINE CONFIGURATIONS AND SWITCH METHOD THEREOF

CROSS REFERENCE TO RELATED APPLICATIONS

This application claims the priority benefit of Taiwan application serial no. 91106811, filed Apr. 4, 2002.

BACKGROUND OF INVENTION

1. Field of Invention

The present invention generally relates to a bus, and more particularly, to a bus for supporting plural signal line configurations and switch method thereof.

2. Description of Related Art

In the current information explosionera, information process and information exchange become an inevitable course for pursuing new knowledge. Moreover, how to achieve the high speed information process and high speed information transfer has become a major objective of current technology development. Thus, the distributed process environment has been adopted by computer systems as the common choice. However, in the distributed process computer system, whether information can be exchanged speedily between each chip charged with a different mission has become a significant factor that greatly impacts the system performance. As to the control chipset of the computer motherboard, the bus between the north bridge chip and the south bridge chip demands a great amount of the information transfer. The bus data transfer performance can be improved by increasing the number of the bus signal lines, however, this method inevitably increases the manufacture cost. Since the limitation of the chip pin number, the control chips used currently all adopt the signal line configuration that supports the transfer in bi-direction, so both the north bridge chip and the south bridge chip can send and receive data. However, when the transfer direction switches, the present method has to insert turn around cycles, and under the situation when the transfer direction switches frequently, too many turn around cycles will significantly impact the transfer performance.

SUMMARY OF INVENTION

Therefore, the present invention provides a bus for supporting plural signal line configurations and the method to switch it, so that the bus can switch to the most appropriate signal line configuration in time to improve the data transfer performance.

In order to achieve the objective mentioned above and others, the present invention provides a bus for supporting plural signal line configurations and the method to switch it. The switching method is used in the bus between two control chips. At first, these two chips receive a signal line configuration switch command. When the signal line configuration switch command is switching to the first signal line configuration, the data line can achieve the bi-direction data transfer between two control chips. Moreover, when the signal line configuration switch command is switching to the second signal line configuration, the plural data lines are divided into two parts, the first part is in charge of the data uni-direction transfer from the first control chip to the second control chip, the second part is in charge of the data uni-direction transfer from the second control chip to the first control chip.

From the description above, by using the bus for supporting plural signal line configurations and the method to switch it from the present invention, when the data transfer load in between the control chips is suitable to make the bus operate in bi-direction data transfer, the bus signal line configuration for bi-direction data transfer is selected. When the transfer direction in the bi-direction data transfer switches frequently, the bus signal lines are divided into two parts, each part is in charge of the data transfer in one direction respectively to avoid using the signal line configuration of the uni-direction data transfer that results in too many turn around cycles, so that the data transfer performance can be improved.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows a configuration sketch map of a VLINK BUS operated in the first signal line configuration of a preferred embodiment according to the present invention.

DETAILED DESCRIPTION

Figure 1:
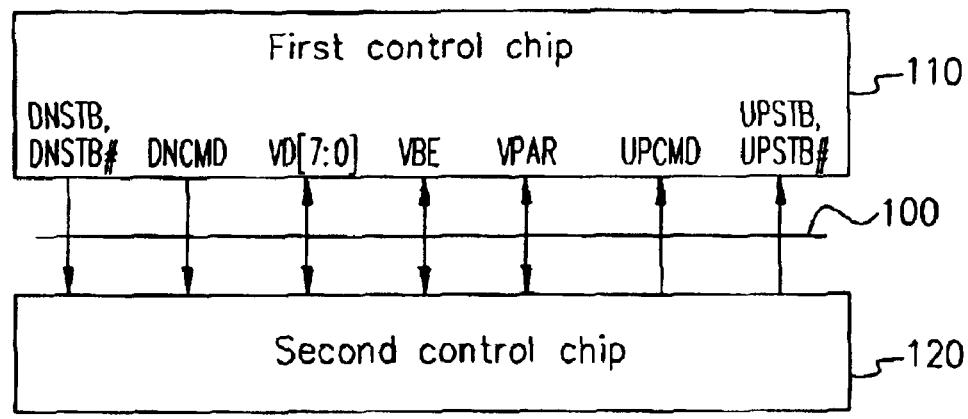
Figure 2:
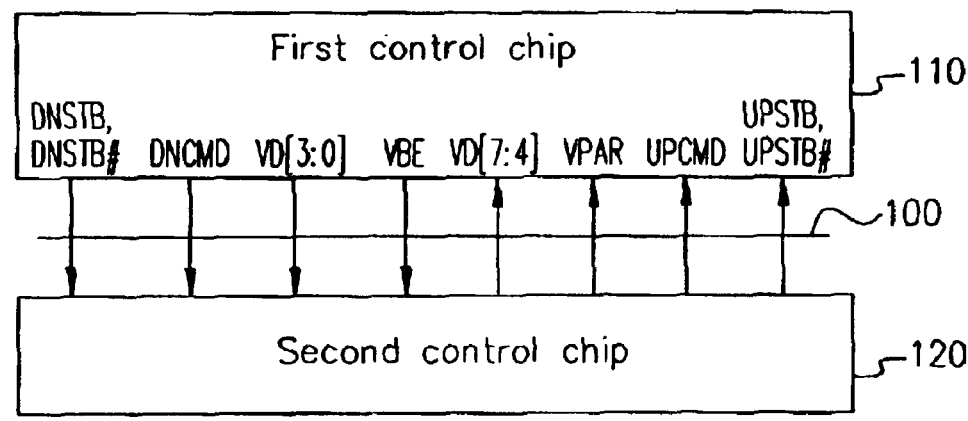
FIG. 2 schematically shows a configuration sketch map of a VLINK BUS operated in the second signal line configuration of a preferred embodiment according to the present invention.

A VLINK BUS used in a preferred embodiment of the present invention is described in detail hereinafter. The VLINK BUS is a bus used in between the control chips designed and invented by VIA Technologies Incorporation. FIG. 1 schematically shows a configuration sketch map of a VLINK BUS operated in the first signal line configuration of a preferred embodiment according to the present invention. FIG. 2 schematically shows a configuration sketch map of a VLINK BUS operated in the second signal line configuration of a preferred embodiment according to the present invention. From the diagrams, the VLINK BUS 100 of the present invention is a bus connected in between the first control chip 110 and the second control chip 120, and is used to provide the data transfer in between these two chips, wherein the first control chip is such as the north bridge chip used in the computer motherboard, and the second control chip is such as the south bridge chip used in the computer motherboard.

The VLINK BUS 100 shown in the diagram comprises a data signal line (VD[7:0]) and a length/byte enable signal line (VBE), a parity signal line (VPAR), an uni-direction upload command signal line (UPCMD), an uni-direction download command signal (DNCMD), an uni-direction upload trigger signal line (UPSTB, UPSTB#), and an uni-direction download trigger signal line (DNSTB, DNSTB#). Therefore, the data signal line (VD[7:0]) cooperated with the length/byte enable signal line (VBE), the parity signal line (VPAR), the uni-direction download command signal line (DNCMD), and the uni-direction download trigger signal line (DNSTB, DNSTB#) can achieve the function of downloading the address and information. Similarly, the data signal line (VD[7:0]) cooperated with the length/byte enable signal line (VBE), the parity signal line (VPAR), the uni-direction upload command signal line (UPCMD), and the uni-direction upload trigger signal line (UPSTB, UPSTB#) can achieve the function of uploading the address and information.

In FIG. 2, the data signal line (VD[7:0]) is divided into two parts, the first part data signal line (VD[3:0]) cooperated with the length/byte enable signal line (VBE), the uni-direction download command signal line (DNCMD), and the uni-direction download trigger signal line (DNSTB, DNSTB#) are exclusively used to download the address and information from the first control chip 110 to the second control chip 120. The second part data signal line (VD[7:4]) cooperated with the parity signal line (VPAR), the uni-direction upload command signal line (UPCMD), and the uni-direction upload trigger signal line (UPSTB, UPSTB#) are exclusively used to upload the address and information from the second control chip 120 to the first control chip 110. Wherein, the parity signal line (VPAR) under the second signal line configuration can switch to the signal line having the same function as the length/byte enable signal line.

Moreover, the upload command signal line (UPCMD) and the download command signal line (DNCMD) are used to transfer the command signal. The command signal at least comprises a bus disconnect command, a bus reconnect command, a data read command, and a data write command. The upload trigger signal line (UPSTB, UPSTB#) and the download trigger signal line (DNSTB, DNSTB#) are used to synchronously latch the command signals, addresses and data signals that are transferred by the data signal line (VD[7:0]), the length/byte enable signal line (VBE), the parity signal line (VPAR), the upload command signal line (UPCMD), and the download command signal line (DNCMD).

Figure 3:
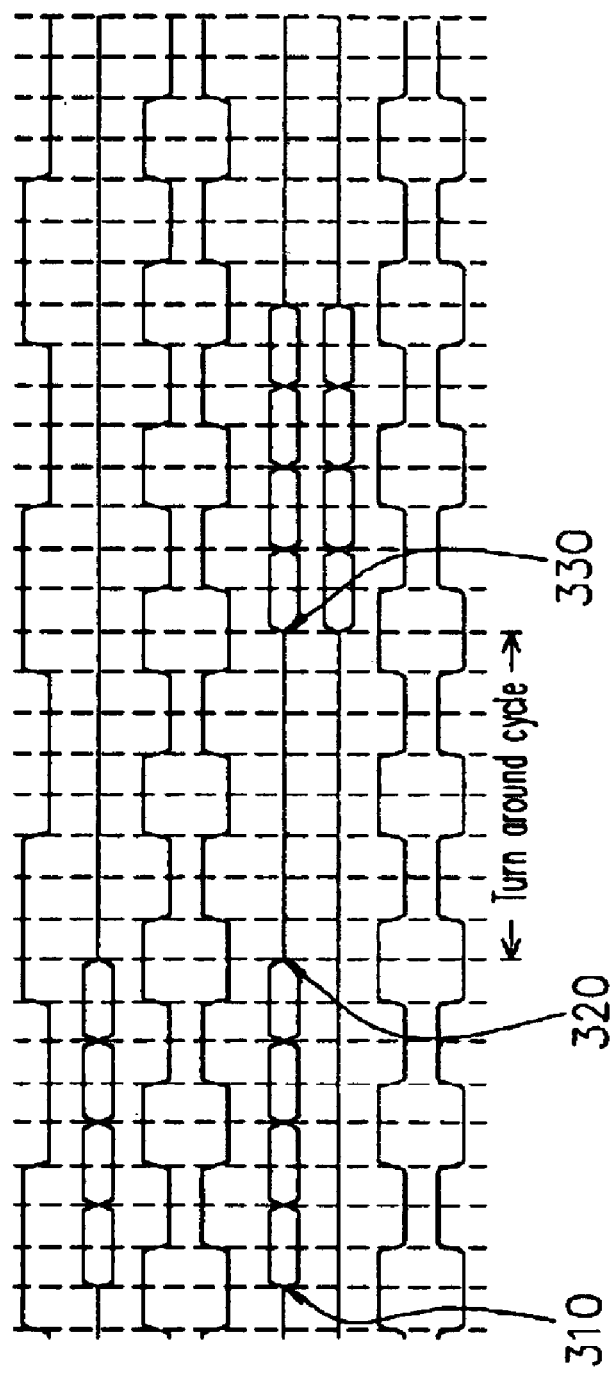
FIG. 3 schematically shows a time sequence diagram of a VLINK BUS operated in the first signal line configuration according to the present invention.

FIG. 3 schematically shows a time sequence diagram of a VLINK BUS operated in the first signal line configuration according to the present invention. Here the data transfer rate is four times the 66 MHz clock frequency. As shown in the diagram, the first control chip 110 starts to use the bus 100 to download data at the time point 310 and stops the usage at time point 320 to release the bus 100. At this moment, although the second control chip 120 intends to upload data, the transfer cannot be started immediately. Only after waiting for a time equal to or more than one turn around cycle, the bus 100 starts to upload data at time point 330. Thus, it is known that this kind of the transfer method with such signal line configuration is highly advantageous to the situation when a great amount of data demand to be transferred in uni-direction. However, if both sides demand data transfer, and the data amount transferred in each time is very little, the transfer direction of bus 100 switches frequently, so that it wastes a lot of turn around cycle time.

Figure 4:
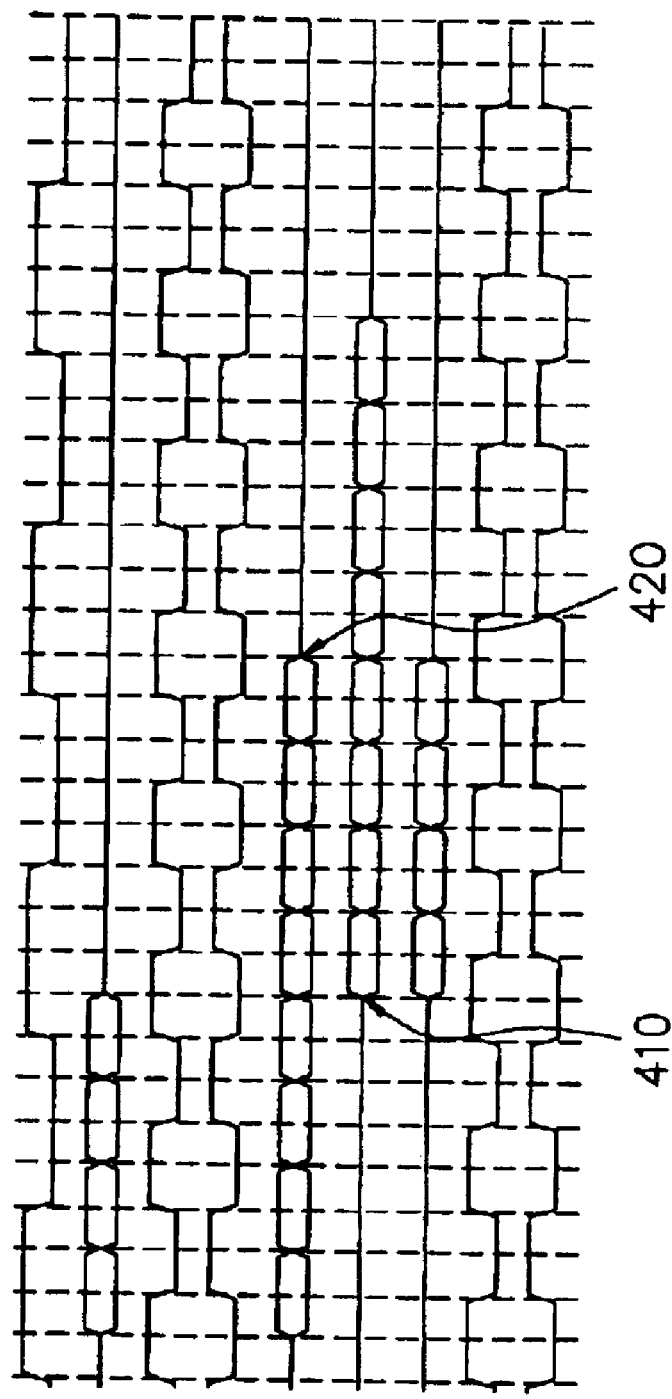
FIG. 4 schematically shows a time sequence diagram of a VLINK BUS operated in the second signal line configuration according to the present invention.

The signal configuration switch operation is shown in FIG. 4, schematically showing a time sequence diagram of a VLINK BUS operated in the second signal line configuration according to the present invention. Here the data transfer rate is four times of the 66 MHz clock frequency. The data signal line (VD[7:0]) had been divided into two parts at this moment, the first part data signal line (VD[3:0]) is exclusively used to download the address and information from the first control chip 110 to the second control chip 120. The second part data signal line (VD[7:4]) is exclusively used to upload the address and information from the second control chip 120 to the first control chip 110. Moreover, in the duration of time point from 410 to 420, the first control chip 110 and the second control chip 120 transfer data simultaneously by using the data signal line (VD[3:0]) and the data signal line (VD[7:4]) respectively. The data transfer rate of the present invention is not limited to four times the 66 MHz clock frequency, other transfer rates such as eight times the 66 MHz clock frequency also can be applied in the present invention.

Figure 5:
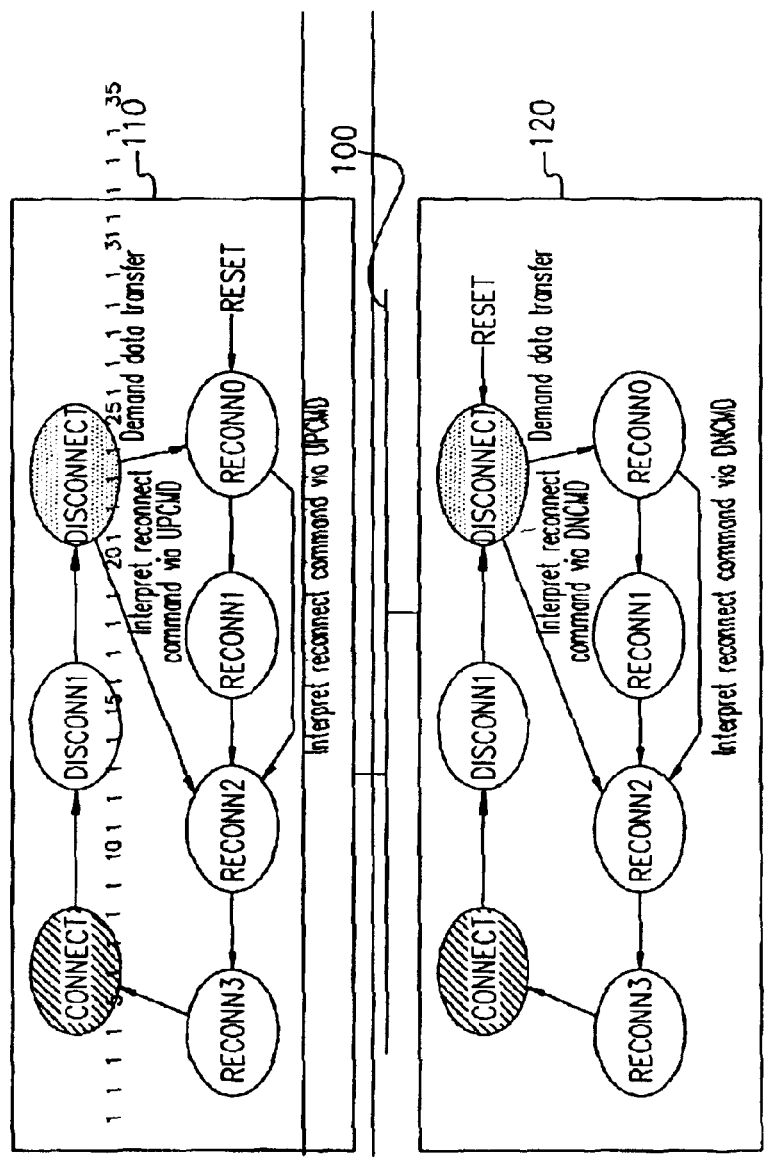
FIG. 5 schematically shows a state diagram of the first control chip and the second control chip of a preferred embodiment according to the present invention.

FIG. 5 schematically shows a state diagram of the first control chip and the second control chip of a preferred embodiment according to the present invention. In the diagram, the first control chip 110 such as the north bridge chip of the computer motherboard and the second control chip 120 such as the south bridge chip of the computer motherboard transfer the commands, addresses and data via the VLINK BUS 100, wherein the first control chip 110 and the second control chip 120 both comprise the state such as RECONN0, RECONN1, RECONN2, RECONN3, CONNECT, DISCONN1 AND DISCONNECT. The difference between them is that the first control chip 110 enters into the RECONN0 state directly when the system is reset, whereas the second control chip 120 enters into the DISCONNECT state directly when system is reset. When system is reset, the first control chip 110 actively drives the download command signal line (DNCMD) a clock cycle to represent the bus reconnect command, and further enters into the CONNECT state via the RECONN1, RECONN2 and RECONN3 state whereas the second control chip 120 enters into the CONNECT state by interpreting the bus reconnect command of the download command signal line (DNCMD) and via the RECONN2 and RECONN3 state when it is in DISCONNECT state.

Figure 6:
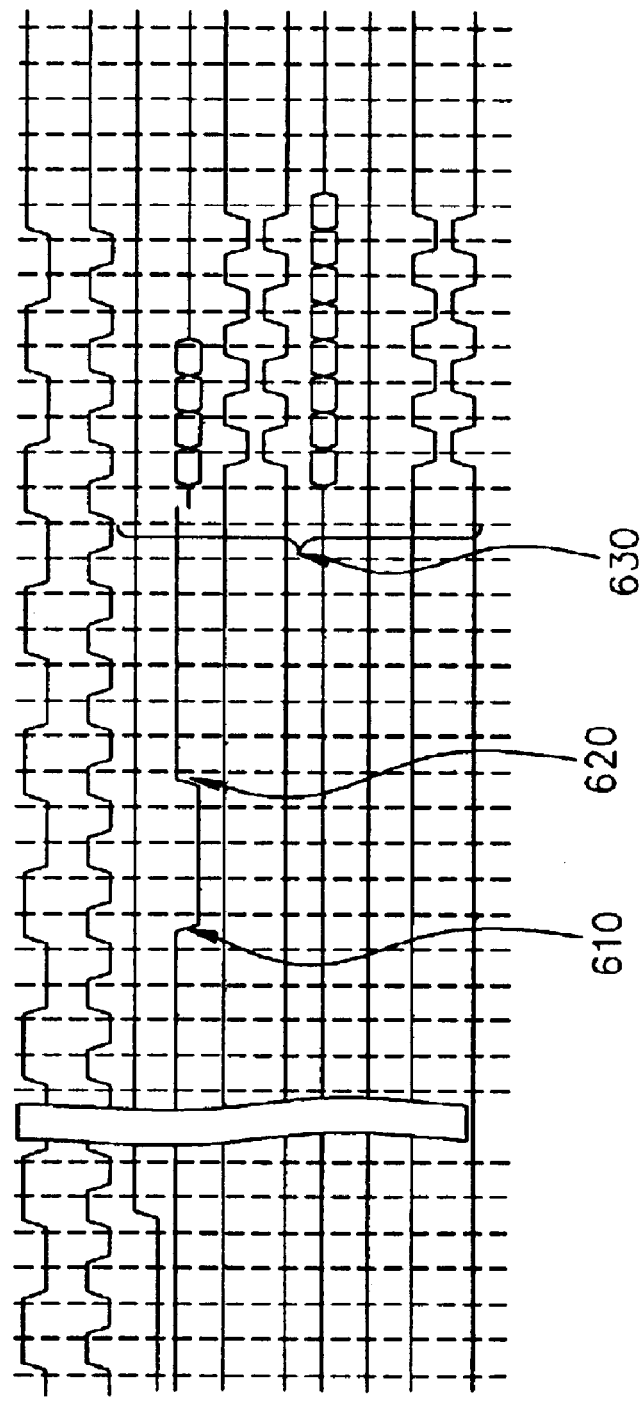
FIG. 6 schematically shows a time sequence diagram of a VLINK BUS when it enters into the first signal line configuration connect state after the system is power on of a preferred embodiment according to the present invention.

FIG. 6 schematically shows a time sequence diagram of a VLINK BUS when it enters into the first signal line configuration connect state after the system is power on of a preferred embodiment according to the present invention. Please also refer to the state diagram shown in FIG. 5. It is known from the description above that the first control chip 110 enters into the RECONN0 state when system is reset, and the second control chip 120 enters into the DISCONNECT state when system is reset. Therefore, when the first control chip 110 enters into the RECONN1 state at the time point 610 as shown in the diagram, it actively drives the download-command signal line (DNCMD) a clock cycle to represent the bus reconnect command, whereas the second control chip 120 interprets the bus reconnect command of the download command signal line (DNCMD) at the time point 620 as shown in the diagram. At this moment, both the first control chip 110 and the second control chip 120 simultaneously enter into the RECONN2 state, and further simultaneously enter into the first signal line configuration CONNECT state at the time point 630 as shown in the diagram after two clock cycles. At this moment, the upload trigger signal line (UPSTB, UPSTB#) and the download trigger signal line (DNSTB, DNSTB#) starts to activate.

Figure 7:
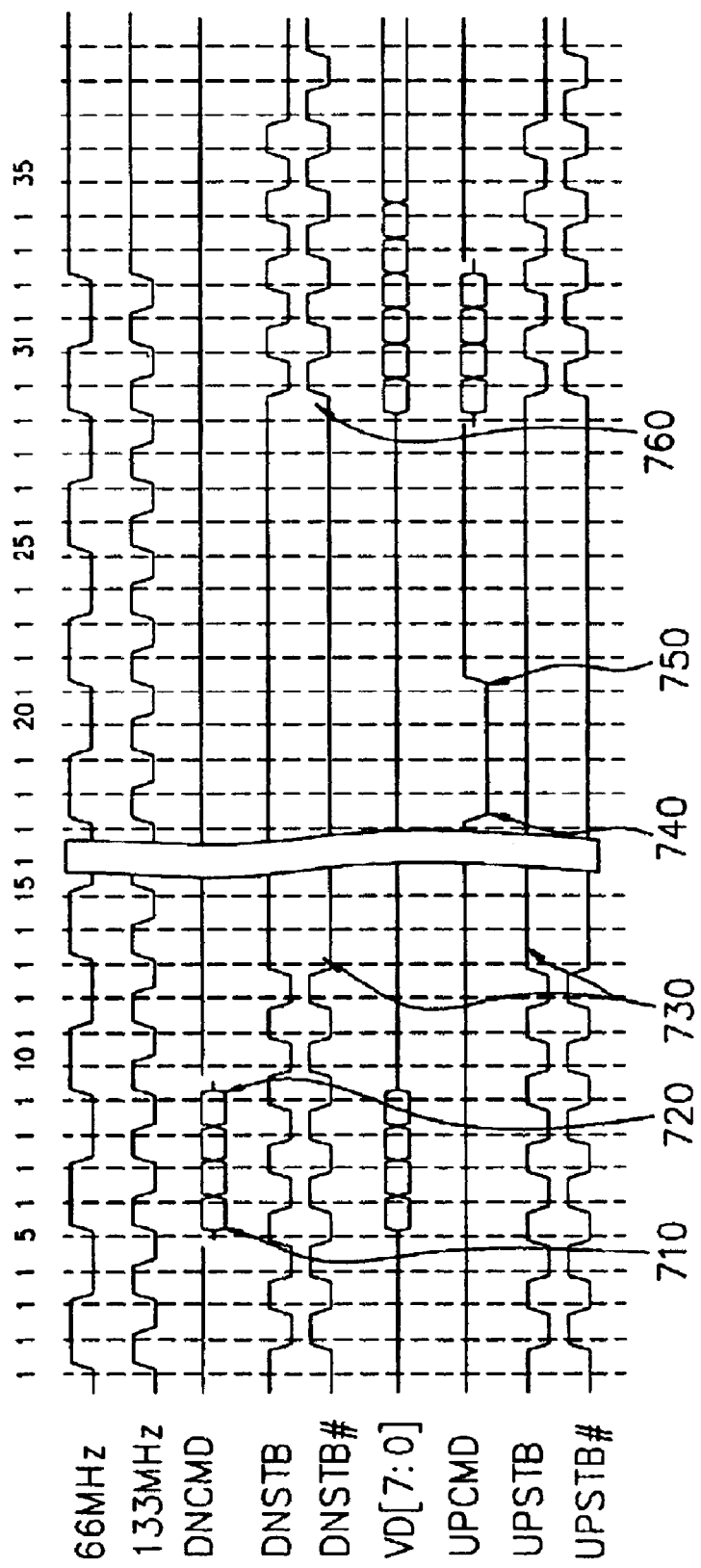
FIG. 7 schematically shows a time sequence diagram of a VLINK BUS when it has entered into the disconnect state and further enters into the first signal line configuration connect state again of a preferred embodiment according to the present invention.

FIG. 7 schematically shows a time sequence diagram of a VLINK BUS when it has entered into the disconnect state and further enters into the first signal line configuration connect state again of a preferred embodiment according to the present invention. Please also refer to the state diagram shown in FIG. 5. In FIG. 7, the first control chip 110 starts to issue the bus disconnect command via the download command signal line DNCMD at the time point 710 as shown in the diagram. At the time point 720, the second control chip 120 interprets the bus disconnect command of the download command signal line DNCMD, and is accompanied by the first control chip 110, to simultaneously enter into the DISCONN1 state, and further simultaneously enter into the DISCONNECT state at the time point 730 as shown in the diagram after one clock cycle. At this moment, the first control chip 110 and the second control chip 120 shutdown the activation of the upload trigger signal line (UPSTB, UPSTB#) and the download trigger signal line (DNSTB, DNSTB#) to save the power consumption. In the present diagram, when both the first control chip 110 and the second control chip 120 are in the DISCONNECT state, since the second control chip 120 demands data transfer, it enters into the RECONN0 state from the DISCONNECT state. The second control chip 120 enters into the RECONN1 state at the time point 740 as shown in the diagram, and actively drives the upload command signal line (UPCMD) a clock cycle to represent the bus reconnect command. The first control chip 110 interprets the bus reconnect command of the upload command signal line (UPCMD) at the time point 750 as shown in the diagram. At this moment, both the first control chip 110 and the second control chip 120 simultaneously enter into the RECONN2 state, and simultaneously enter into the first signal line configuration CONNECT state at the time point 760 as shown in the diagram after two clock cycles. At this moment, the upload trigger signal line (UPSTB, UPSTB#) and the download trigger signal line (DNSTB, DNSTB#) start to activate again to provide the data transfer demand.

Figure 8:
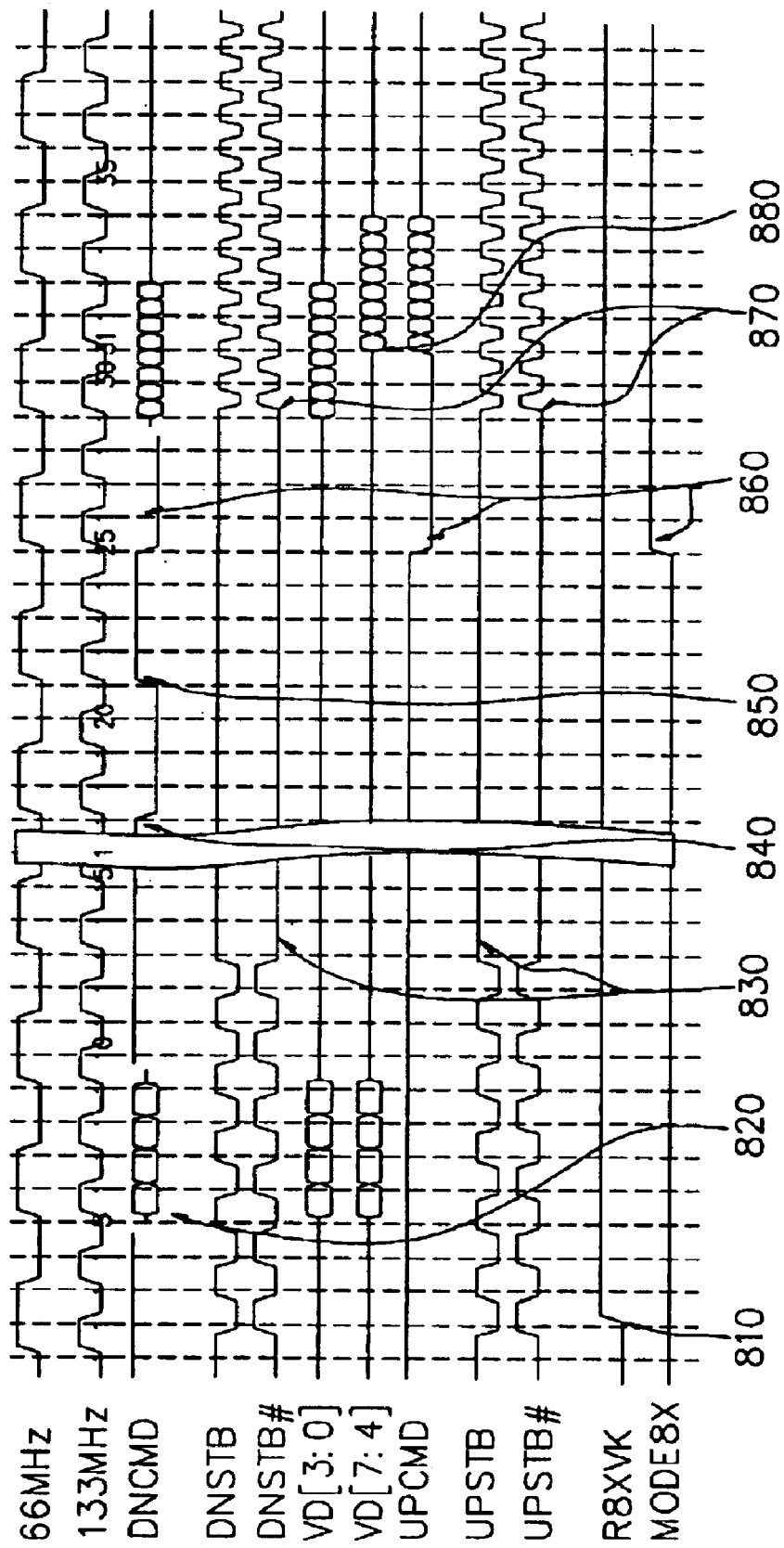
FIG. 8 schematically shows a time sequence diagram of a VLINK BUS when it has entered into the disconnect state and further enters into the second signal line configuration connect state again of a preferred embodiment according to the present invention.

FIG. 8 schematically shows a time sequence diagram of a VLINK BUS when it has entered into the disconnect state and further enters into the second signal line configuration connect state again of a preferred embodiment according to the present invention. In the diagram, the first control chip 110 and the second control chip 120 of the present invention both provide an internal register R8XVK (this is the configuration register) and an internal signal MODE8X to determine the signal line configuration when the VLINK BUS is reconnected. In the present example, when R8XVK is in the low level, the signal line configuration is the first signal line configuration that transfers in bi-direction. When the R8XVK is in the high level, the signal line configuration is the second signal line configuration that transfers in uni-direction respectively.

Figure 9:
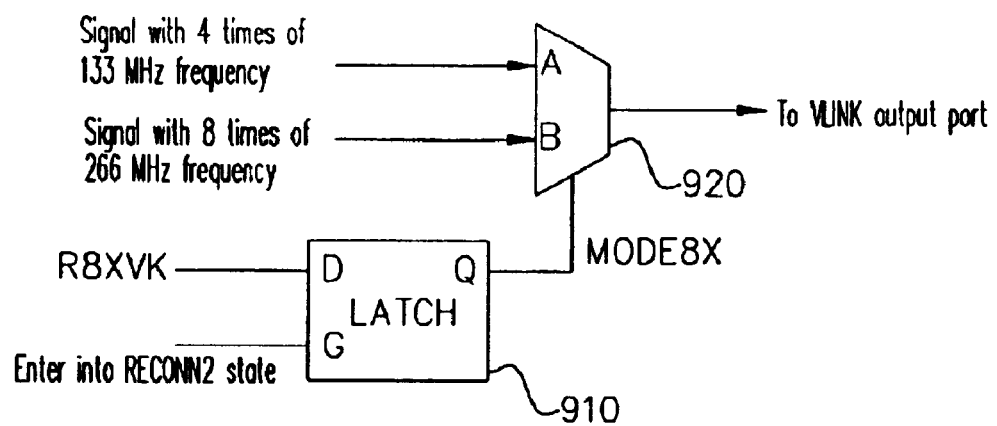
FIG. 9 schematically shows a sketch map of the switch control circuit for the VLINK BUS signal line of a preferred embodiment according to the present invention.

How the bus signal line configuration switches from the first signal line configuration to the second signal line configuration is described in FIG. 8. When the system thinks the bus 100 signal line configuration currently used is not appropriate, it issues a signal line configuration switch command to simultaneously program the register R8XVK inside the first control chip 110 and the second control chip 120 to high level at time point 810 in the diagram. Afterwards, the first control chip 110 issues the bus disconnect command at time point 820 as shown in the diagram. Moreover, the first control chip 110 and the second control chip 120 simultaneously enter into the DISCONNECT state at time point 830 as shown in the diagram. Since the first control chip 110 demands bus to transfer data, the first control chip 110 drives the download command signal line (DNCMD) a clock cycle to represent the bus reconnect command at time point 840 as shown in the diagram. The second control chip 120 interprets the bus reconnect command of the download command signal line (DNCMD) at time point 850 as shown in the diagram. At this moment, the first control chip 110 and the second control chip 120 simultaneously enter into the RECONN2 state. Moreover, at time point 860 in the diagram, the data latch flip flop 910 shown in FIG. 9 latches the output of the R8XVK to its output terminal MODE8X, the internal control signal MODE8X is used as the selection input of the multiplexer 920 to select outputting the driving output signal having eight times the clock frequency to the bus signal line. The data signal line (VD[7:0]) is divided into two parts, the first part data signal line (VD[3:0]) is exclusively used to download the address and data signal from the first control chip 110 to the second control chip 120. The second part data signal line (VD[7:4]) is exclusively used to upload the address and data signal from the second control chip 120 to the first control chip 110, wherein when switching to the second signal line configuration, the data transfer clock rate of the bus 100 is also raised to eight times of the clock frequency. The reason for doing so is to maintain the bandwidth and frequency of send/receive data for the control kernel circuit in the control chip invariable. Those who are skilled in the related art may optionally maintain the data transfer clock rate of the bus 100 and alter the send/receive clock rate or circuit of the control kernel. In the present embodiment, it preferably selects to maintain the data transfer clock rate of the bus 100 as eight times of the clock frequency. At the moment, the upload command signal line (UPCMD) and the download command signal line (DNCMD) are also varied from active low to active high. Moreover, the first control chip 110 and the second control chip 120 simultaneously enter into the CONNECT state of the second signal line configuration at time point 870 as shown in the diagram after one clock cycle. At this moment, the upload trigger signal line (UPSTB, UPSTB#) and the download trigger signal line (DNSTB, DNSTB#) start to activate. Furthermore, the first control chip 110 and the second control chip 120 simultaneously transfer data by using the data signal line (VD[3:0]) and the data signal line (VD[7:4]) respectively at time point 880 as shown in the diagram.

Those who are skilled in the related art should understand how to program the register R8XVK to low level via the application program or the driver program, so as to switch the bus signal line configuration from the second signal line configuration to the first signal line configuration to select the operation method with the most appropriate signal line configuration, as it is only a converse process of the descriptions mentioned above.

From the descriptions above, a method for switching the bus signal line configuration can be inducted, the method is suitable for a bus having plural signal line configurations and in between the first control chip and the second control chip. The method comprises the steps of: at first, the first control chip and the second control chip receive a signal line configuration switch command. Then, when there is no data transaction in progress or the data transaction is completed, the first control chip issues a bus disconnect command. The first control chip and the second control chip enter into the bus disconnect state according to the bus disconnect command. Moreover, the first control chip or the second control chip issues a bus reconnect command. Finally, the first control chip and the second control chip reconnect to one of the signal line configurations according to the signal line configuration switch command.

Therefore, by using the bus for supporting plural signal line configurations and the method to switch it from the present invention, when the data transfer load in between the control chips is suitable to make the bus operated in bi-direction data transfer, the bus signal line configuration for bi-direction data transfer is selected. When the transfer direction in the bi-direction data transfer switches frequently, the bus is selected to operate with uni-direction transfer respectively to maintain the best flexibility of the signal line configuration.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A bus signal line configuration switch method, suitable for a bus in between a first control chip and a second control chip, the bus has a plurality of signal line configurations, the method comprising the following steps:

the first control chip and the second control chip receiving a signal line configuration switch command;

wherein when the signal line configuration switch command is switching to a first signal line configuration, a plurality of data lines can achieve a bi-direction data transfer between the first control chip and the second control chip; and wherein when the signal line configuration switch command is switching to a second signal line configuration, the plurality of data lines are divided into two parts, a first part is in charge of an uni-direction data transfer from the first control chip to the second control chip, a second part is in charge of an uni-direction data transfer from the second control chip to the first control chip.

2. The bus signal line configuration switch method of claim 1, wherein the first control chip is a north bridge chip, the second control chip is a south bridge chip.

3. The bus signal line configuration switch method of claim 1, wherein both the first control chip and the second control chip have a configuration register, to temporarily store the signal line configuration switch command.

4. The bus signal line configuration switch method of claim 1, wherein in the first signal line configuration, the bi-direction data transfer is accomplished by using a first transfer speed, moreover in the second signal line configuration, the uni-direction data transfer is accomplished by using a speed that equals a specific multiple of the first transfer speed.

5. The bus signal line configuration switch method of claim 4, wherein the specific multiple is two times.

6. A bus signal line configuration switch method, suitable for a bus in between a first control chip and a second control chip, the method comprising following steps:

wherein in a first signal line configuration, a plurality of data lines can achieve a bi-direction data transfer between the first control chip and the second control chip; and wherein in a second signal line configuration, the plurality of data lines are divided into two parts, a first part is in charge of a uni-direction data transfer from the first control chip to the second control chip, a second part is in charge of a uni-direction data transfer from the second control chip to the first control chip.

7. The bus signal line configuration switch method of claim 6, wherein the first control chip is a north bridge chip, the second control chip is a south bridge chip.

8. The bus signal line configuration switch method of claim 6, wherein in the first signal line configuration, the bi-direction data transfer is accomplished by using a first transfer speed, moreover in the second signal line configuration, the uni-direction data transfer is accomplished by using a speed that equals a specific times of the first transfer speed.

9. The bus signal line configuration switch method of claim 8, wherein the specific times is two times.

10. A bus for supporting a plurality of signal line configurations, suitable for a bus in between a first control chip and a second control chip, the bus comprising:

a data signal line set, used to transfer an address and a data; and a control signal line set, used to transfer a control signal;

wherein the signal line configurations comprise:

a first signal line configuration, wherein the data signal line set is used to transfer the data in bi-direction between the first control chip and the second control chip; and a second signal line configuration, wherein the data signal line set and the control signal line set are divided into a first part and a second part, the data signal line set and the control signal line set of the first part are exclusively used to transfer the address and the data from the first control chip to the second control chip, the data signal line set and the control signal line set of the second part are exclusively used to transfer the address and the data from the second control chip to the first control chip.

11. The bus for supporting the plurality of signal line configurations of claim 10, wherein the first control chip is a north bridge chip, the second control chip is a south bridge chip.

12. The bus for supporting the plurality of signal line configurations of claim 10, wherein both the first control chip and the second control chip have a configuration register, used to temporarily store one of the selected signal line configurations.

13. The bus for supporting the plurality of signal line configurations of claim 10, wherein in the first signal line configuration, the bi-direction data transfer is accomplished by using a first transfer speed, moreover in the second signal line configuration, the uni-direction data transfer is accomplished by using a speed that equals a specific multiple of the first transfer speed.

14. The bus for supporting the plurality of signal line configurations of claim 13, wherein the specific multiple is two times.

* * * * *